US012623789B1

(12) United States Patent
Clark et al.

(10) Patent No.: US 12,623,789 B1
(45) Date of Patent: May 12, 2026

(54) SYSTEM, APPARATUS AND METHOD FOR AN UNMANNED AERIAL VEHICLE WITH MEMORY SECURED AGAINST TAMPERING AND ACCESS

(71) Applicant: BlueHalo, LLC, Huntsville, AL (US)

(72) Inventors: Alexis Henry Clark, Owens Crossroads, AL (US); Michael Joseph Bell, Finksburg, MD (US)

(73) Assignee: BlueHalo, LLC, Huntsville, AL (US)

( * ) Notice: Subject to any disclaimer, the term of this patent is extended or adjusted under 35 U.S.C. 154(b) by 778 days.

(21) Appl. No.: 17/681,270

(22) Filed: Feb. 25, 2022

(51) Int. Cl.
| | |
|---|---|
| *B64D 27/24* | (2024.01) |
| *B64C 39/02* | (2023.01) |
| *B64D 27/30* | (2024.01) |
| *G05D 1/00* | (2006.01) |
| *G05D 1/10* | (2006.01) |
| *G06F 8/65* | (2018.01) |
| *B64U 50/19* | (2023.01) |

(52) U.S. Cl.
CPC ............. *B64D 27/30* (2024.01); *G05D 1/101* (2013.01); *B64D 2221/00* (2013.01); *B64U 50/19* (2023.01)

(58) Field of Classification Search
CPC .. B64D 27/24; B64D 2221/00; B64C 39/024; G05D 1/101; B64U 50/19
See application file for complete search history.

(56) References Cited

U.S. PATENT DOCUMENTS

| | | | | |
|---|---|---|---|---|
| 9,524,648 | B1 * | 12/2016 | Gopalakrishnan ... | G08G 5/0069 |
| 10,007,265 | B1 * | 6/2018 | Larsen ............... | B64D 45/0034 |
| 10,811,590 | B1 * | 10/2020 | Pedmo ................. | H04R 17/005 |
| 2008/0007928 | A1 * | 1/2008 | Salama ................. | H05K 1/029 |
| | | | | 361/784 |
| 2014/0074347 | A1 * | 3/2014 | Martin ............... | G06F 11/2294 |
| | | | | 701/31.4 |
| 2014/0195808 | A1 * | 7/2014 | Lortz ................. | H04L 63/0263 |
| | | | | 713/170 |
| 2015/0067314 | A1 * | 3/2015 | Strauss ................ | G06F 21/572 |
| | | | | 713/1 |
| 2017/0237840 | A1 * | 8/2017 | Yun ....................... | H04M 1/026 |
| | | | | 455/550.1 |
| 2017/0308725 | A1 * | 10/2017 | Sardaryan ................ | G06F 1/08 |
| 2018/0098423 | A1 * | 4/2018 | Brodsky ............. | G08B 13/128 |
| 2018/0367211 | A1 * | 12/2018 | Loots ...................... | H04L 67/34 |
| 2019/0227538 | A1 * | 7/2019 | Lassini ................. | G06F 9/4401 |
| 2020/0250903 | A1 * | 8/2020 | Arya ....................... | H04L 69/14 |
| 2021/0264799 | A1 * | 8/2021 | Belt ........................ | B64F 1/005 |
| 2023/0244784 | A1 * | 8/2023 | Rodriguez ............. | G06F 21/87 |
| | | | | 726/34 |
| 2024/0199220 | A1 * | 6/2024 | Silina ..................... | B64U 50/19 |

* cited by examiner

*Primary Examiner* — Anne Marie Antonucci
*Assistant Examiner* — Connor L Knight
(74) *Attorney, Agent, or Firm* — Amster, Rothstein & Ebenstein LLP

(57) ABSTRACT

Systems, apparatus and methods are provided for securing firmware and mission data in memory of an unmanned aerial vehicle. The unmanned aerial vehicle may include a central body and at least one electric motor. The central body may include a flight controller with a processor, a firmware memory configured to receive and store firmware, and circuit board with a fixed portion and a removable portion with a programming interface connector providing access through a signal connection to a firmware memory operatively connected to the flight controller. The central body may further include a volatile mission memory configured to receive mission data and automatically be erased upon power interruption.

45 Claims, 4 Drawing Sheets

300

1002

1008

1006

SYSTEM, APPARATUS AND METHOD FOR AN UNMANNED AERIAL VEHICLE WITH MEMORY SECURED AGAINST TAMPERING AND ACCESS

FIELD OF THE INVENTION

The present invention generally relates to a system and apparatus and method for secure firmware and mission data in memory of an unmanned aerial vehicle.

BACKGROUND

In certain environments, unmanned aerial vehicles are used to perform surveillance and other related tasks. One problem facing those conditions is that unauthorized parties, for example upon interception, can modify or access firmware and mission data stored in memory of such unmanned aerial vehicles. The problem is further enhanced by the fact that such unmanned aerial vehicles may need to be controlled autonomously, tending to result in a loss of physical security or a possibility of being lost, while carrying sensitive and important information. It would therefore be beneficial to provide an unmanned, autonomously operated, aerial vehicle that is able to carry high-value data in memory but that is resistant to, or protected from, data tampering or intrusion.

SUMMARY

In view of the above, it is the object of the present disclosure to provide a system and apparatus to overcome the technological challenges faced in conventional autonomously and remotely operated unmanned aerial vehicles carrying.

In embodiments, an unmanned aerial vehicle may include: a. a central body including: i. a flight controller including at least one processor; ii. a firmware memory operatively connected to the flight controller and configured to receive and store firmware including processor executable instructions for directing movement of the unmanned aerial vehicle; and iii. a circuit board including: 1. a fixed portion including: a. a flight controller connector operatively connected to the flight controller; and b. a signal connection operatively connected to the firmware memory; and 2. a removable portion including at least one programming interface connector operatively connected to the signal connection, wherein, when the removable portion is attached to the fixed portion, the at least one programming interface connector is configured to receive by the at least one programming interface connector the firmware, and provide the firmware to the firmware memory of the flight controller via the signal connection and the flight controller connector, and wherein when the removable portion is removed from the fixed portion the operative connection between the at least one programming connector and the signal connection is eliminated and the at least one programming interface connector does not provide the firmware to the firmware memory; and b. at least one electric motor operatively connected to the central body and connected to at least one propeller such that the at least one propeller is rotatable by the at least one electric motor, wherein the at least one electric motor is controlled by control signals received from the flight controller according to the firmware.

In embodiments, the at least one programming interface connector extends out of an exterior of the circuit board.

In embodiments, the at least one programming interface connector is the only connector of the unmanned aerial vehicle configured to receive the firmware and to provide the firmware to the firmware memory.

In embodiments, the at least one programming interface connector includes at least one pull-up resistor.

In embodiments, the at least one pull-up resistor embodies a match with the flight controller that is prerequisite to completing a transmit receive circuit allowing the firmware to be received and provided to the firmware memory of the flight controller.

In embodiments, the at least one programming interface connector includes a plurality of programming interface connectors.

In embodiments, the at least one programming interface connector includes a plurality of pull-up resistors.

In embodiments, the at least one programming interface connector includes at least one capacitor.

In embodiments, removal of the removable portion from the fixed portion prevents firmware from being provided to the firmware memory.

In embodiments, the central body further includes a volatile mission memory operatively connected to the flight controller and configured to receive and store mission data including processor executable instructions for providing control signals to the at least one electric motor based on the firmware to direct movement of the unmanned aerial vehicle according to a mission, and wherein the volatile mission memory is configured to be automatically erased upon interruption of power to the volatile mission memory for a period of time.

In embodiments, the volatile mission memory is operatively connected to a removable memory card inserted into a data port of the unmanned aerial vehicle and the mission data is received by the volatile mission memory from the removable memory card.

In embodiments, the removable memory card is a removable microSD card.

In embodiments, the circuit board further includes a radio interface operably connected to at least one radio transceiver and the volatile mission memory is operably connected to the radio interface and configured to receive the mission data through the at least one radio transceiver.

In embodiments, the fixed portion further includes a plurality of peripheral connectors operatively connected to at least one peripheral device of the unmanned aerial vehicle.

In embodiments, the central body further includes a power distribution board electrically connected to the flight controller.

In embodiments, the firmware memory is encapsulated within an interior portion of the flight controller.

In embodiments, at least a portion of the firmware memory is encapsulated by a layer of epoxy covering an otherwise exposed portion of the firmware memory.

In embodiments, the firmware memory is a soldered module.

In embodiments, the volatile mission memory includes random access memory.

In embodiments, the unmanned aerial vehicle may further include data clearing circuitry operatively connected to the random access memory and configured to clear data in the volatile mission memory upon interruption of electric power to the random access memory for the period of time.

In embodiments, the data clearing circuitry includes at least one capacitor.

In embodiments, the data clearing circuitry includes at least one resistor.

In embodiments, the data clearing circuitry includes at least one capacitor and at least one resistor.

In embodiments, the circuit board further includes an attachment portion connecting the removable portion to the fixed portion, and wherein the attachment portion is at least one of: scored, partially scored, weakened, partially weakened, thinned, and partially thinned to allow the removable portion to be removed from the fixed portion.

In embodiments, the firmware memory is configured to retain the firmware upon interruption of power to the firmware memory.

In embodiments, the mission data is stored solely within the volatile mission memory.

In embodiments, the signal connection is a trace on the circuit board.

In embodiments, the signal connection is a wire embedded within the interior of the circuit board.

In embodiments, when the removable portion is attached to the fixed portion, the at least one programming interface connector is configured to receive the firmware from an external memory card.

In embodiments, when the removable portion is attached to the fixed portion, the at least one programming interface connector is configured to receive the firmware from an external processor.

In embodiments, the circuit board further includes a data port and the volatile mission memory is operably connected to the data port and configured to receive the mission data through the data port.

In embodiments, the data port is configured to receive a removable memory card and the volatile mission memory is configured to receive the mission data from the removable memory card.

In embodiments, the removable memory card is a removable microSD card.

In embodiments, the circuit board further includes at least one radio interface operably connected to at least one radio receiver, wherein the volatile mission memory is operably connected to the at least one radio interface and configured to receive the mission data through the at least one radio interface from the at least one radio transceiver.

In embodiments, an unmanned aerial vehicle may include: a central body including: i. a flight controller including at least one processor; ii. a firmware memory operatively connected to the flight controller and configured to receive and store firmware including processor executable instructions for directing movement of the unmanned aerial vehicle; and iii. a volatile mission memory operatively connected to the flight controller and configured to receive and store mission data including processor executable instructions for providing control signals based on the firmware to direct movement of the unmanned aerial vehicle according to a mission, wherein the volatile mission memory is configured to be automatically erased upon interruption of power to the volatile mission memory for a period of time; and b. at least one electric motor operatively connected to the central body and connected to at least one propeller such that the at least one propeller is rotatable by the at least one electric motor, wherein the at least one electric motor is controlled by the control signals provided by the flight controller according to the firmware.

In embodiments, the central body further includes a data port and the volatile mission memory is operably connected to the data port and configured to receive the mission data through the data port.

In embodiments, the data port is configured to receive a removable memory card and the volatile mission memory is configured to receive the mission data from the removable memory card.

In embodiments, the removable memory card is a removable microSD card.

In embodiments, the central body further includes at least one radio interface operably connected to at least one radio receiver, wherein the volatile mission memory is operably connected to the at least one radio interface and configured to receive the mission data through the at least one radio interface from the at least one radio transceiver.

In embodiments, the central body further includes a power distribution board electrically connected to the flight controller.

In embodiments, the volatile mission memory includes random access memory.

In embodiments, the unmanned aerial vehicle further includes data clearing circuitry operatively connected to the random access memory and configured to clear data in the volatile mission memory upon interruption of electric power to the random access memory for the period of time.

In embodiments, the data clearing circuitry includes at least one capacitor.

In embodiments, the data clearing circuitry includes at least one resistor.

In embodiments, the data clearing circuitry includes at least one capacitor and at least one resistor.

In embodiments, the mission data is stored solely within the volatile mission memory.

BRIEF DESCRIPTION OF THE DRAWINGS

The above and related objects, features and advantages of the present disclosure will be more fully understood by reference to the following detailed description of the preferred, albeit illustrative, embodiments of the present invention when taken in conjunction with the accompanying figures, wherein.

DETAILED DESCRIPTION OF THE EXEMPLARY EMBODIMENTS

The present invention generally relates to a system and apparatus and method for secured data within memory of an unmanned aerial vehicle. In embodiments, the unmanned aerial vehicle may be used in conjunction with firmware and mission data in a specially secured memory or memories.

General functionality, operation, and how components may be stored within and used in conjunction with, unmanned aerial vehicles is described in detail in U.S. Provisional Application Nos. 63/260,042 (titled METHOD AND APPARATUS FOR MEASURING OPTICAL TURBULENCE USING AN UNMANNED AERIAL VEHICLE) and 63/260,095 (titled SYSTEM AND APPARATUS FOR A HIGH-POWER MICROWAVE SENSOR USING AN UNMANNED AERIAL VEHICLE), the entire contents of which are herein incorporated by reference.

Figure 1A:
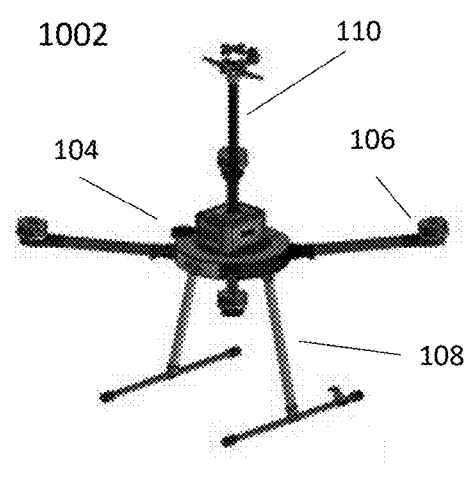
FIGS. 1A, 1B, and 1C are schematic illustrations of conventional unmanned aerial vehicles.
Figure 1B:
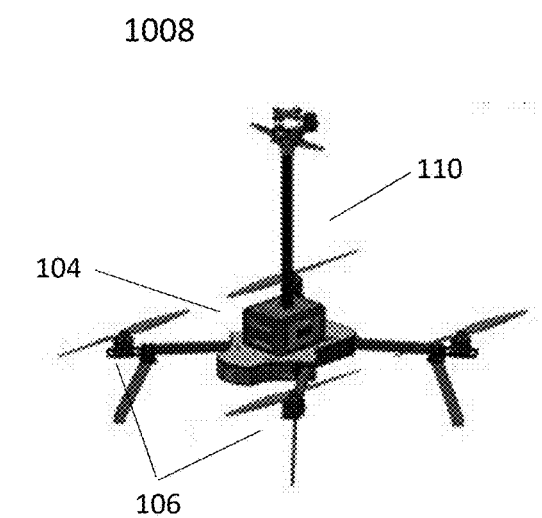
Figure 1B:
Figure 1C:
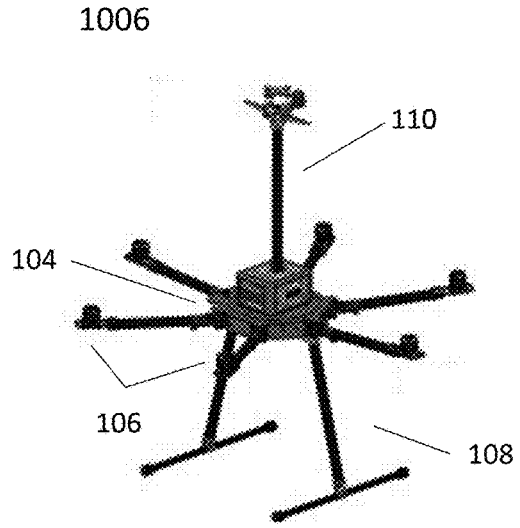
Figure 2:
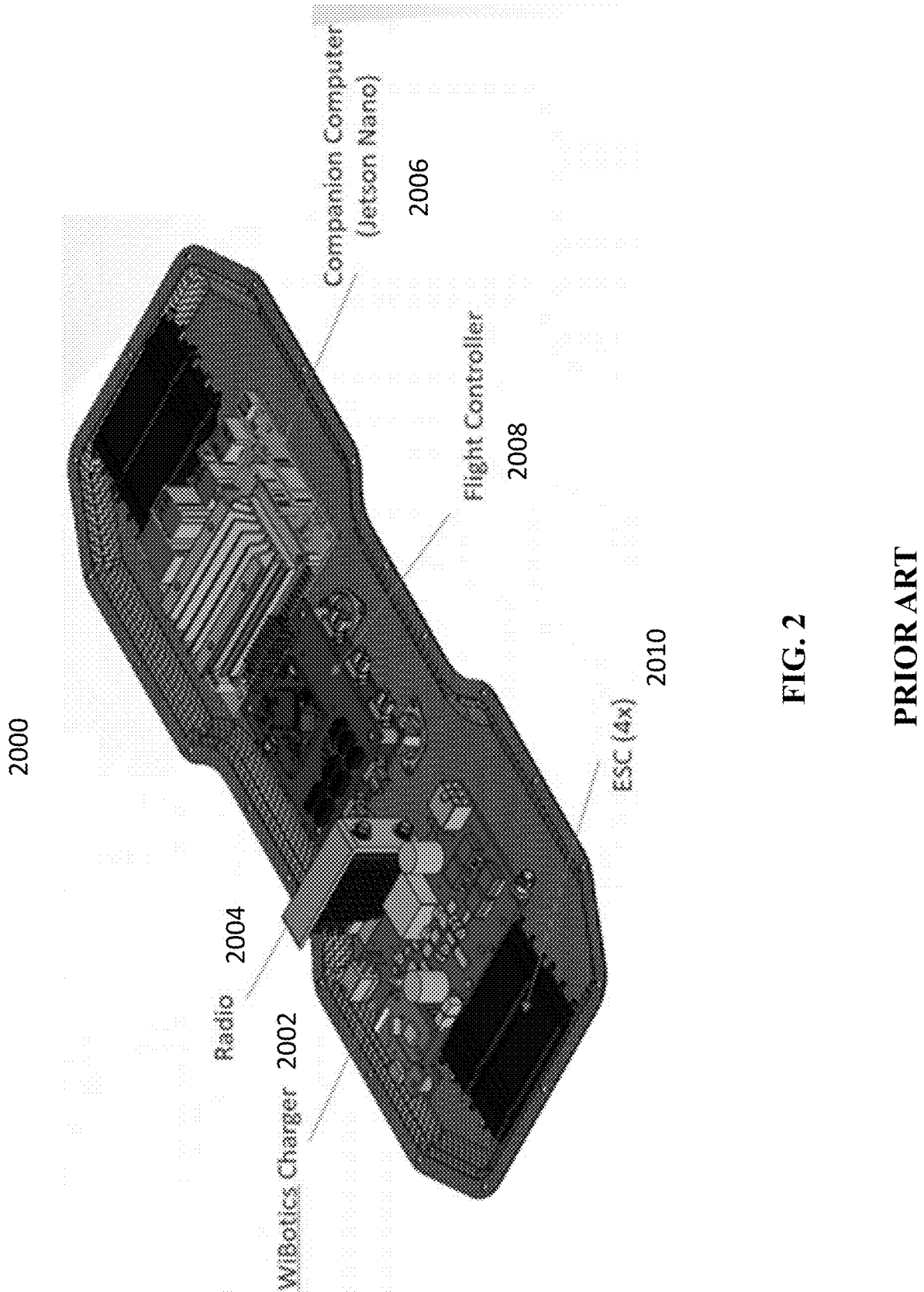
FIG. 2 is a schematic illustration of the central body of a conventional unmanned aerial vehicle.

FIGS. 1A, 1B, and 1C are schematic illustrations of various conventional unmanned aerial vehicles 1002, 1006, 1008 with representative mission payloads. In each of these vehicles 1002, 1006, 1008, a central body 104 is provided which houses electronic components (see, e.g., FIG. 2) utilized to control the flight of the unmanned aerial vehicle 1002, 1006, 1008 including operating the motors 106. By way of illustration, FIG. 2 shows an example of a conventional central body 2000 including a power source 2002, a flight controller 2008, radio 2004, electronic speed controllers 2010, and a computer processor 2006, all contained within a common chamber. FIG. 1A illustrates an exemplary unmanned aerial vehicle 1002 with four motors. FIG. 1B illustrates an exemplary unmanned aerial vehicle 1006 with four motors. FIG. 1C illustrates an exemplary unmanned aerial vehicle 1008 with six motors. Each exemplary unmanned aerial vehicle 1002, 1006, 1008 may also carry a mission payload 110 (such as illustrated here), mounted on a support structure 108 connected to the central body 104. Examples of mission payloads 110 may include, for example, a weather sensor, an electromagnetic field sensor, a digital or video camera, and/or an infrared camera, to name a few.

In certain environments, unmanned aerial vehicles are used to perform surveillance and other related tasks. For example, unmanned aerial vehicles may be used to obtain footage of structures and persons. Various circumstances, for example, weather, projectiles, electronic interference, and the like, for example during a mission, (e.g. anytime after the unmanned vehicle is released from the direct physical custody of its authorized user) may affect the operation of the unmanned aerial vehicle and cause a temporary or permanent interruption of the mission. For example, the unmanned vehicle may, temporarily or permanently, be retrieved from the air and placed into the physical custody of an unauthorized individual or group. The resulting problem is that such unauthorized person(s) may seek to interfere with data, such as firmware, on such unmanned aerial vehicle, and may seek to recover data, such as mission data, from such unmanned aerial vehicle. Depending on the level of sophistication of the unauthorized person(s), such attempt may be successful.

In embodiments, a central body of an unmanned aerial vehicle in accordance with the present disclosure may contain a chamber or enclosure housing a flight controller, a memory or memories, and other circuitry, with the memory or memories being protected from unauthorized modification and/or accessing. In addition, other components of the unmanned aerial vehicle, e.g., an antenna, batteries, a motor, to name a few, may be located outside the enclosure and operatively connected to electronic components positioned therein. As described in greater detail, these collections of unconventional and inventive features allow unmanned aerial vehicles made in accordance with embodiments of the present invention to operate outside of the physical custody of an authorized user, while carrying sensitive firmware and mission data that unauthorized individuals will not be able to modify and/or recover.

In embodiments, such circuitry as discussed herein may be included within an such an appropriately sized chamber or enclosure, for example such chamber or enclosure as is shown in FIG. 2. In embodiments, such chamber or enclosure may be a central body, for example as shown in FIGS. 1A-1C. In embodiments, such central body may be open or partially open or closed or partially enclosed. Advantageously, as the components as discussed herein provide security for data, including firmware and mission data, the central body may in embodiments not be constructed of such strength or weight as to provide significant resistance to physical intrusion or opening thereof, advantageously reducing weight. In embodiments, the central body may include electronic components used for communication with and navigation of the unmanned electronic vehicle, and components used to drive the motors and power the unmanned aerial vehicle. It is appreciated by those skilled in the art that modifications to the design and components shown may be made without departing from the letter and spirit of the present invention. For example, the unmanned aerial vehicle, consistent with the disclosure of the electronic circuitry of the present invention, may be or may instead be an unmanned hovercraft, an unmanned plane, an unmanned ground vehicle, an unmanned underwater vehicle, an unmanned space vehicle, or other unmanned vehicle such as a mobile robot.

In embodiments, the unmanned aerial vehicle may include a payload. In embodiments, the payload may be or may include a measurement device, a camera, an infrared camera, a thermal imaging camera, a high-power microwave generating device, an EMP-generating device, or other electronic energy disrupter to name a few. In embodiments, such disrupter may be configured to direct electrical disruption, discontinuation, interruption, and/or loss at the circuitry of the unmanned aerial device itself, such as circuitry positioned in a central body. In embodiments, such a disrupter may be positioned in proximity to the circuitry, for example within the same central body.

In embodiments, the unmanned aerial vehicle may include a central body, and at least one electric motor operatively connected to the central body. In embodiments, the central body may include an enclosure, which may house electronic circuitry usable in the direction and control of the unmanned aerial vehicle. In embodiments, the enclosure may include a top wall, a bottom wall, and at least one side wall connecting the top wall and the bottom wall such that the top wall, the bottom wall, and the side wall define a chamber, for example in the shape of a box, a cube, a cylinder, or other shape suitably arranged for storage of the electronic circuitry and devices herein disclosed.

In embodiments, the enclosure may include a plurality of electronic components positioned in the chamber. In embodiments, the electronic components may include one more signal processing systems, radio transceivers, and navigation systems.

Figure 3:
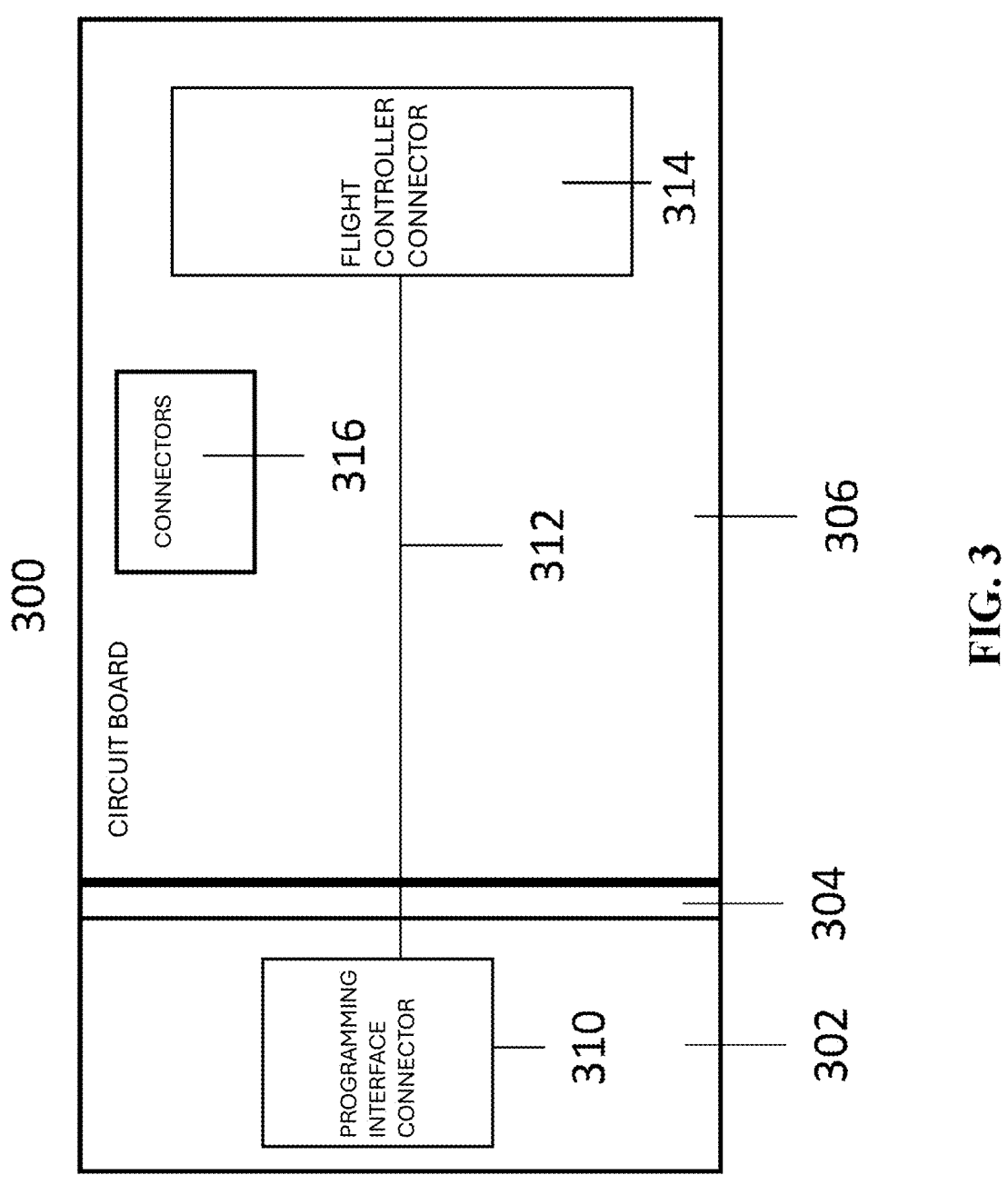
FIG. 3 is a schematic illustration of a circuit board in accordance with embodiments of the present invention.

FIG. 3 is a schematic illustration of a circuit board in accordance with embodiments of the present invention. In embodiments, a circuit board 300, as shown in FIG. 3, may be located within or enclosed by or mounted at or in the central body or enclosure or chamber, or in other embodiments, may be placed or mounted elsewhere on the unmanned aerial vehicle. The circuit board 300 may be made up of or include one or more planar or non-planar carrying substrates on which electronic components, for example as discussed further herein, may be affixed, mounted, or embodied on or within, or otherwise physically connected or physically associated.

In embodiments, the circuit board 300 may include a removable portion 302 removably attached to a fixed portion 306. In embodiments, the attachment of the removable portion 302 to the fixed portion 306 may occur by an attachment portion 304. In embodiments, the attachment portion 304 may, be located adjacent to both the removable portion 302 and the fixed portion 306, for example where the removable portion 302 and the fixed portion 306 are adjacent to each other. In embodiments, the attachment portion may be in the shape of a line, of two, three, or four edges of a rectangle, of a circle or semicircle, to name a few. In embodiments, the attachment portion 304 may be a weakened, partially weakened, scored, partially scored, thinned, or partially thinned portion of circuit 300. In embodiments the attachment portion may be a clip, glue or adhesive-such as a low-grade or low-adhesion-level or chemically disable-able glue or adhesive, epoxy, such as a low-grade or low-adhesion-level or chemically disable-able epoxy, a rod or wire or electrically conductive trace material or series of rods or wires or electrically conductive trace materials embedded in or upon the fixed portion 306 and/or removable portion 302, to name a few, or other component or part attaching but permitting the removal of the removable portion 302 from the fixed portion 306, or a combination thereof. In embodiments, the removal of the removable portion 302 from fixed portion 306 using the attachment portion 304 can be achieved manually or using available equipment (e.g., pliers), such that the fixed portion 306 is not damaged or greatly damaged. In embodiments, the removable portion 302 is also not damaged. In embodiments, the attachment portion 304 may be constructed such that the removable portion 302 is in the form of a break-away JTAG. In embodiments, the fixed portion 306 and removable portion 302 can be reattached if desired by one possession of both components, or the fixed portion 306 or removable portion 302 can be later attached to another similar complementary component, such as a replacement for the portion which has been dis-attached from it. In embodiments, as discussed further below, the separation may be permanent with future reattachment not being possible or easily or readily achievable. In embodiments, the signal connection, and associated interfaces thereto, for example at or in the vicinity of the attachment portion 304, may be made of a less than standard thickness or strength, so as to permit ready breakoff of such signal connection 312 at or in the vicinity of the attachment portion 304. In embodiments, the removable portion 302 may be directly removably attached to the fixed portion 306.

In embodiments, the removable portion 302 may have fixed thereon at least one programming interface connector 310. In embodiments, the at least one programming interface connector 310 may extend out of an exterior of the circuit board, advantageously making access easier when the removable portion 302 is present on the unmanned aerial vehicle. In embodiments, the at least one programming interface connector includes at least one pull-up resistor. The at least one programming interface connector 310 or pull-up resistor may include programming interface connectors or several pull-up resistors, for example two, three, four, six, eight, ten or more. The at least one programming interface connector 310 may include one or more resistors, one or more capacitors, or a combination of one or more resistors and one or more capacitors. In embodiments, the resistors, capacitors, or combination thereof may be matched one for one with connection points appearing on the circuit board 300. In embodiments, the resistors, capacitors, or combination thereof may be matched according a layout requirement or requirements of the circuit board 300, such as a Future Technology devices International Limited (FTDI) board layout requirement or requirements.

Figure 4:
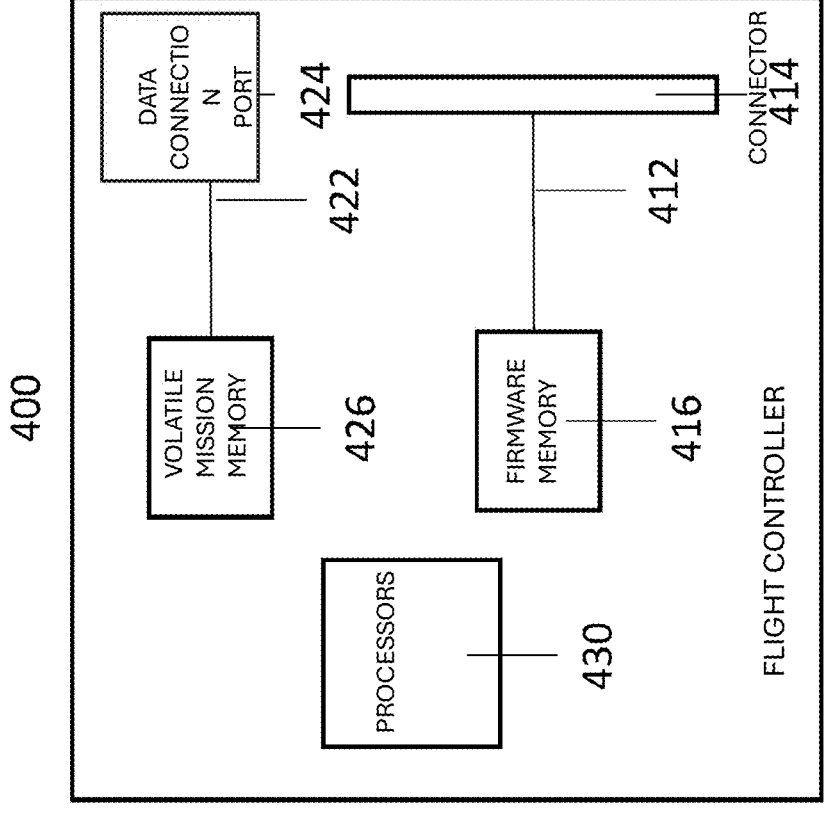
FIG. 4 is a schematic illustration of a flight controller in accordance with embodiments of the present invention.

The at least one programming interface connector 310 or pull-up resistor may embody a match with the flight controller 400 (for example, as shown in FIG. 4) prerequisite to a transfer of information to the firmware. For example, in embodiments, the match may be required to complete a transmit receive circuit allowing the firmware to be received and provided to a firmware memory 416 of the flight controller 400. In embodiments, the required match may be a match in voltage or current levels associated with both the at least one pull-up resistor or at least one programming interface connector 310 and the printed circuit board. Accordingly, in such embodiments, once the at least one programming interface connector 310 or at least one pull-up resistor is removed, the match can only be achieved if voltage or voltages or current or currents are applied to the signal connection 312 in the correct amount or amounts. In embodiments, each guess may require such unauthorized party to provide its own specially configured pull-up resistor or other advice. Advantageously, in embodiments, it may be very difficult or impossible for an unauthorized party to guess these amount(s) correctly within a useful examination period. Further advantageously, in embodiments, it will be necessary to make many incorrect guesses before arriving at a reasonable probability of a correct guess, rendering the sensitive data (e.g. firmware) effectively unmodifiable.

In embodiments, as an alternate or additional security measure, the firmware, when executed by the at least one processor 430 of the flight controller 400, may be configured to require device filtering, such that only devices according to a prespecified description or devices providing a prespecified key or passcode can modify, or can access, the firmware.

In embodiments, the at least one programming interface connector 310 may be connected, by a signal connection 312, to a flight controller connector 314, such that information and/or data (e.g. firmware) received at the at least one programming interface connector 310 can be passed via the signal connection 312 and the flight controller connector 314. In embodiments, the at least one programming interface connector 310 may be the only connector of the unmanned aerial vehicle that is configured to receive such information and/or data (e.g. firmware).

In embodiments, the sensitive data (e.g. firmware) may be supplied via a firmware supplying device connected to the at least one programming interface connector 310. The firmware supplying device may be an external processor, an external computer or computing device (e.g. via USB cable connection), or an external memory card or memory stick read via a hardware or hardware-implemented software loader for data stored thereon.

In embodiments, the signal connection 312 may be in the form of a trace on the circuit board 300, or a wire. In embodiments, the signal connection may be on the surface of the circuit board 300 or may be buried within internal layers thereof, advantageously making physical access, for example via probing, more difficult. In embodiments, the signal connection 312 may be inserted within micro-holes that are drilled or otherwise provided within the circuit board 300.

In embodiments, one or more additional connectors 316 may be located on the circuit board 300. In embodiments, such additional connectors 316 may be peripheral connectors for connecting peripheral devices used by the unmanned aerial vehicle. In embodiments, such additional connectors 316 may be located on the fixed portion 306 of the circuit board 300. In embodiments, the additional connectors may be one or more or a plurality of peripheral connectors. In embodiments, such peripheral connectors may be operatively connected to at least one peripheral device of the unmanned aerial vehicle, for example a camera, an infrared camera, a radio transceiver, an electronic disrupter or EMP generator, or a secondary guidance system, to name a few.

In embodiments, the circuit board 300 may contain one or more radio connectors and may contain one or more pulse width modulation connectors.

FIG. 4 is a schematic illustration of a flight controller 400 in accordance with embodiments of the present invention. In embodiments, the flight controller 400 may have a connector 414 capable of interfacing with, and receiving electronic signals from, flight controller connector 314 of circuit board 300. In embodiments, the connector 414 may be operatively connected to a continuation 412 of signal connection 312 and through such continuation 412 to a firmware memory 416, which may be included on or operatively connected to the flight controller 400. In embodiments, the at least one programming interface connector 310 may be the only connector of the unmanned aerial vehicle that is configured to provide sensitive information and/or data (e.g. firmware) to the firmware memory 416. The firmware memory 416 may be configured to receive and store firmware, for example with such firmware having processor executable instructions for directing movement of the unmanned aerial vehicle In embodiments, when the signal connection is complete and operational, data or information (e.g. firmware) may be received at the at least one programming interface connector 314 of the removable portion 302 of the circuit board 300, traverse the signal connection 312 to the flight controller connector 314, be passed through the connector 414 to the continuation 412 and ultimately be received at, and stored in, firmware memory 416 of the flight controller.

In embodiments, the receipt of the data or information (e.g. firmware) at the at least one programming interface connector 310 may be achieved by operably connecting a firmware-supplying device to the at least one programming interface connector 310.

In embodiments, the firmware memory 416 may have physically protection from direct access. For example, in embodiments, the firmware memory 416 may be encapsulated within an interior portion of the flight controller 400. In embodiments, the firmware memory 416 may be encapsulated by a layer of epoxy, glue, solder, or other protective substance, or a combination thereof, covering an otherwise exposed portion of the firmware memory. In embodiments, the firmware memory 416 may be a soldered module.

In embodiments, the flight controller 400 may have thereon or be operatively connected to one or more processors 430, capable of directing the unmanned aerial vehicle according to the firmware. For example, in embodiments, the one or more processors 430 may operate according to firmware stored in the firmware memory to direct movement of the unmanned aerial vehicle via at least one operably connected electric motor having a respective propeller or propellers connected thereto and rotatable by the electric motor. In embodiments, the one or more processors may be a single main controller, or may be a main controller and a backup controller. In embodiments, processor functionality of may be split between such main and backup controller, or the backup controller may take over responsibility for the functionality in the event that failure of the main controller is detected. In embodiments, the control of the electric motor may occur according to control signals received from the flight controller according to the firmware. In other embodiments, for example where other types of vehicles are employed, movement may be directed by the one or more processors 430 of the flight controller 400 or another controller configured in the manner disclosed herein, for example via wheels, water propulsion engines, robotic legs, jet engines, propulsion fans, to name a few, depending on the unmanned vehicle being controlled.

In embodiments, a data connection port 424 of the flight controller 400 may be operatively connected to a data connection 422 and thereby to a volatile mission memory 426 attached or physically associated with or operatively connected to the flight controller 400. In embodiments, data can be received at the data connection port 424 and provided to the volatile mission memory 426. In embodiments, the data connection port may be configured to receive a removable memory card containing the mission data. In embodiments, the removable memory card may be a microSD card, to name one. In other embodiments, data can be received at the connector 414 and supplied therefrom to the volatile mission memory 426, for example selectively according to the type of data or according to an instruction received in association with the data. The data or information supplied to the volatile mission memory 426 may be mission data, or other sensitive or potentially sensitive data.

In embodiments, the memory card or other device providing the mission data may be selectively kept within the data connection port 424 during the mission, depending upon the sensitivity of the mission and according to whether complete erasure of the mission data is desired upon a loss, interruption or discontinuance of power.

In embodiments, the circuit board 300 or the flight controller 400 may include or be operably connected to a radio interface operably connected to at least one radio transceiver. In embodiments, the volatile mission memory 426 may be operably connected to the radio interface, and may be configured to receive sensitive data such as the mission data through the at least one radio transceiver. In embodiments, the at least one radio transceiver may be two, three, four or more or more radio transceivers.

In embodiments, the volatile mission memory 426 may be configured to receive and store sensitive data such as mission data, and the mission data may include processor executable instructions for providing control signals to a motor such as at least one electric motor. In embodiments, such controls signals may be based on the firmware (such as may be stored in firmware memory 416) and may direct movement of the unmanned aerial vehicle, for example according to a mission described by the mission data. In embodiments, the mission may be described by the mission data for example by a number of objectives, by way of example traveling to a first particular location defined by GPS coordinates, taking footage of a site of interest having a particular description, and then traveling to a second particular GPS location, to name a few. In embodiments, a GPS microchip or unit, such as those manufactured by Stella GPS LLC, may be associated with the flight controller so as to aid in achieving such a mission by providing and updating the GPS to the flight controller. In embodiments, a global navigation satellite system module, for example with real-time kinematic functionality, may be employed for location obtaining and updating to the flight controller 400.

In embodiments, the volatile mission memory 426 may be configured to be automatically erased upon interruption of power to the volatile mission memory 426 for a period of time. In embodiments, the volatile mission memory 426 may include or consist of random access memory. In embodiments, the random access memory may be configured to lose its stored data upon loss or interruption or discontinuance of power for a period of time. In embodiments, the period of time may be predetermined, or may be variable, for according to specifications associated with the particular random access memory employed. In embodiments, the period of time may be one millisecond, two milliseconds, or a range of times between a quarter of a millisecond and fifty milliseconds, to name a few.

In embodiments, to secure the erasure of the sensitive data such as mission data, data clearing circuitry may be employed. In embodiments, the data clearing circuitry may be configured to clear data in the volatile mission memory 426, (which may, as discussed herein, be or include random access memory) upon the loss or interruption or discontinuance of electric power to the volatile mission memory 426 for the period of time. The data clearing circuitry may include or consist of at least one capacitor, at least one resistor, or at least one capacitor and at least one resistor.

In embodiments, the firmware memory 416 may be configured in the manner of the volatile mission memory 426 to lose its data (e.g. firmware) upon loss or interruption or discontinuance of electric power to the firmware memory 416 for a period of time. In other embodiments, the firmware memory 416 is configured to keep its data (e.g. firmware) upon such loss or interruption or discontinuance. Thus, upon a general loss (or discontinuation or interruption) of power, certain data (e.g. mission data) may be erased, while certain data (e.g. firmware) may be kept, albeit, in embodiments, rendered unmodifiable. As, in embodiments, the mission data may be stored solely within the erased portion, i.e. the volatile mission memory 426, the mission data may advantageously become unrecoverable upon physical compromise of the unmanned aerial vehicle resulting in power loss or discontinuance or interruption as such mission data may no longer be stored in the unmanned aerial vehicle.

In embodiments, the unmanned aerial vehicle may be configured to lose or interrupt general power or power to specific components (e.g. the volatile mission memory 426) upon occurrence of specified events. For example, physical damage to the unmanned aerial vehicle may cause such loss or interruption or discontinuance, as may a detection by the flight controller 300 or another processor of specified conditions, such as deviation from a mission or specified mission location or route, and sufficient loss of altitude, tripping of internal sensors indicating the central body 104 has been opened or accessed, to name a few. In embodiments, such events may trigger an electronic disruption device, or a message to a power source such as those described herein to permanently or temporarily cease providing power, so as to ensure the interruption or loss or discontinuance occurs and data is erased from the volatile mission memory.

In embodiments, power may be applied, for example within the central body, and for example to the circuit board 300 and the flight controller 400, including memory or memories therein, and to peripheral devices, via a power distribution board. In embodiments, such a power distribution board may be electrically connected to the circuit board 300, the flight controller 400, or both. In embodiments, alternately or in addition, power may be provided by the power distribution board to motors such as electronic motors. In embodiments, the power distribution board may provide several different power sources, which may be at varying levels (e.g., 12 volts, 5 volts, motor-level power, to name a few), depending on the power needs of the supplied devices. In embodiments, the power distribution board may be implemented in the form of a separate printed circuit board, rather than integrated with circuit board 300 or flight controller 400, such that its high current or high voltage signals may not create undue levels of electromagnetic interference. In embodiments, a power source may be integrated with one or both of circuit board 300 and flight controller 400.

In embodiments, the power distribution board may be arranged in a stack with other components discussed herein.

For example, the stack may comprise one or more or all of the power distribution board, circuit board 300, flight controller 400, and a GPS unit or global navigation satellite system module. In embodiments, such may be the order from bottom to top within such a stack. In embodiments, such a stack may be located in the chamber or central body 104.

In embodiments, there is a process flow for securely loading firmware in an unmanned aerial vehicle in accordance with embodiments of the present invention. In embodiments, as an initial step, a firmware supplying device, which may contain or be able to retrieve data such as firmware, may be connected to one or more programming interface connectors 310 of a removable portion 302 of a circuit board 300, for example as discussed herein.

Then, in embodiments, the data (e.g. firmware) may be loaded from the firmware supplying device to a firmware memory 416 via a signal connection 312. In embodiments, as discussed herein, this data transfer route may traverse one or more or all of one or more programming interface connectors 310, a signal connection 312 spanning the removable portion 302, a fixed portion 306, an attachment portion 304 therebetween, a flight controller connector 314, a connector 414 of a flight controller 400, a continuation 412 of the signal connection 312, and ultimately be delivered to the firmware memory 416, for example as discussed herein.

Then, in embodiments, the removable portion 302 may be removed from the fixed portion 306. In embodiments, this may eliminate an operative connection between the at least one programming interface connectors 310 and the firmware memory 416, and may preclude loading or provision or further loading or further provision of firmware into the firmware memory 416, for example as discussed herein.

In embodiments, there a process flow for securely loading mission data into, and operating during a mission, an unmanned aerial vehicle in accordance with embodiments of the present invention.

In embodiments, as an initial step, mission data may be loaded into a volatile mission memory 426 operatively connected to a flight controller 400. In embodiments, this may occur, for example, by insertion of a USB card or other data source having thereon or having access to sensitive data such as mission data, into a data connection port 424 operatively connected, for example by a data connection 422 (which may for example be a wire or a circuit board trace), and thereby to the volatile mission memory 426, for example as discussed herein. In embodiments, the step of loading the mission data into the volatile mission memory may include providing a memory card containing the mission data to a memory card slot operatively connected to the volatile mission memory 426, loading the mission data into the volatile mission memory 426 from the memory card, and removing the memory card from the memory card slot.

Then, in embodiments, the unmanned aerial vehicle may be sent on a mission. In embodiments, the mission may be according to the mission data loaded onto the volatile mission memory 426. In embodiments, the movement of the unmanned aerial vehicle may be directed by the flight controller 400 (for example, by its processor 430 sending instructions to electric motors effecting movement of the unmanned aerial vehicle) according to the mission data, for example as discussed herein.

Then, in embodiments, then, upon an interruption, for example during the mission, of power to the volatile mission memory 426, the mission data or other sensitive data may be automatically erased from the volatile mission memory 426, for example as discussed herein.

In embodiments, an unmanned aerial vehicle may include: a. a central body including: i. a flight controller including at least one processor; ii. a firmware memory operatively connected to the flight controller and configured to receive and store firmware including processor executable instructions for directing movement of the unmanned aerial vehicle; and iii. a circuit board including: 1. a fixed portion including: a. a flight controller connector operatively connected to the flight controller; and b. a signal connection operatively connected to the firmware memory; and 2. a removable portion including at least one programming interface connector operatively connected to the signal connection, wherein, when the removable portion is attached to the fixed portion, the at least one programming interface connector is configured to receive by the at least one programming interface connector the firmware, and provide the firmware to the firmware memory of the flight controller via the signal connection and the flight controller connector, and wherein when the removable portion is removed from the fixed portion the operative connection between the at least one programming connector and the signal connection is eliminated and the at least one programming interface connector does not provide the firmware to the firmware memory; and b. at least one electric motor operatively connected to the central body and connected to at least one propeller such that the at least one propeller is rotatable by the at least one electric motor, wherein the at least one electric motor is controlled by control signals received from the flight controller according to the firmware.

In embodiments, the at least one programming interface connector extends out of an exterior of the circuit board.

In embodiments, the at least one programming interface connector is the only connector of the unmanned aerial vehicle configured to receive the firmware and to provide the firmware to the firmware memory.

In embodiments, the at least one programming interface connector includes at least one pull-up resistor.

In embodiments, the at least one pull-up resistor embodies a match with the flight controller that is prerequisite to completing a transmit receive circuit allowing the firmware to be received and provided to the firmware memory of the flight controller.

In embodiments, the at least one programming interface connector includes a plurality of programming interface connectors.

In embodiments, the at least one programming interface connector includes a plurality of pull-up resistors.

In embodiments, the at least one programming interface connector includes at least one capacitor.

In embodiments, removal of the removable portion from the fixed portion prevents firmware from being provided to the firmware memory.

In embodiments, the central body further includes a volatile mission memory operatively connected to the flight controller and configured to receive and store mission data including processor executable instructions for providing control signals to the at least one electric motor based on the firmware to direct movement of the unmanned aerial vehicle according to a mission, and wherein the volatile mission memory is configured to be automatically erased upon interruption of power to the volatile mission memory for a period of time.

In embodiments, the volatile mission memory is operatively connected to a removable memory card inserted into a data port of the unmanned aerial vehicle and the mission data is received by the volatile mission memory from the removable memory card.

In embodiments, the removable memory card is a removable microSD card.

In embodiments, the circuit board further includes a radio interface operably connected to at least one radio transceiver and the volatile mission memory is operably connected to the radio interface and configured to receive the mission data through the at least one radio transceiver.

In embodiments, the fixed portion further includes a plurality of peripheral connectors operatively connected to at least one peripheral device of the unmanned aerial vehicle.

In embodiments, the central body further includes a power distribution board electrically connected to the flight controller.

In embodiments, the firmware memory is encapsulated within an interior portion of the flight controller.

In embodiments, at least a portion of the firmware memory is encapsulated by a layer of epoxy covering an otherwise exposed portion of the firmware memory.

In embodiments, the firmware memory is a soldered module.

In embodiments, the volatile mission memory includes random access memory.

In embodiments, the unmanned aerial vehicle may further include data clearing circuitry operatively connected to the random access memory and configured to clear data in the volatile mission memory upon interruption of electric power to the random access memory for the period of time.

In embodiments, the data clearing circuitry includes at least one capacitor.

In embodiments, the data clearing circuitry includes at least one resistor.

In embodiments, the data clearing circuitry includes at least one capacitor and at least one resistor.

In embodiments, the circuit board further includes an attachment portion connecting the removable portion to the fixed portion, and wherein the attachment portion is at least one of: scored, partially scored, weakened, partially weakened, thinned, and partially thinned to allow the removable portion to be removed from the fixed portion.

In embodiments, the firmware memory is configured to retain the firmware upon interruption of power to the firmware memory.

In embodiments, the mission data is stored solely within the volatile mission memory.

In embodiments, the signal connection is a trace on the circuit board.

In embodiments, the signal connection is a wire embedded within the interior of the circuit board.

In embodiments, when the removable portion is attached to the fixed portion, the at least one programming interface connector is configured to receive the firmware from an external memory card.

In embodiments, when the removable portion is attached to the fixed portion, the at least one programming interface connector is configured to receive the firmware from an external processor.

In embodiments, the circuit board further includes a data port and the volatile mission memory is operably connected to the data port and configured to receive the mission data through the data port.

In embodiments, the data port is configured to receive a removable memory card and the volatile mission memory is configured to receive the mission data from the removable memory card.

In embodiments, the removable memory card is a removable microSD card.

In embodiments, the circuit board further includes at least one radio interface operably connected to at least one radio receiver, wherein the volatile mission memory is operably connected to the at least one radio interface and configured to receive the mission data through the at least one radio interface from the at least one radio transceiver.

In embodiments, an unmanned aerial vehicle may include: a central body including: i. a flight controller including at least one processor; ii. a firmware memory operatively connected to the flight controller and configured to receive and store firmware including processor executable instructions for directing movement of the unmanned aerial vehicle; and iii. a volatile mission memory operatively connected to the flight controller and configured to receive and store mission data including processor executable instructions for providing control signals based on the firmware to direct movement of the unmanned aerial vehicle according to a mission, wherein the volatile mission memory is configured to be automatically erased upon interruption of power to the volatile mission memory for a period of time; and b. at least one electric motor operatively connected to the central body and connected to at least one propeller such that the at least one propeller is rotatable by the at least one electric motor, wherein the at least one electric motor is controlled by the control signals provided by the flight controller according to the firmware.

In embodiments, the central body further includes a data port and the volatile mission memory is operably connected to the data port and configured to receive the mission data through the data port.

In embodiments, the data port is configured to receive a removable memory card and the volatile mission memory is configured to receive the mission data from the removable memory card.

In embodiments, the removable memory card is a removable microSD card.

In embodiments, the central body further includes at least one radio interface operably connected to at least one radio receiver, wherein the volatile mission memory is operably connected to the at least one radio interface and configured to receive the mission data through the at least one radio interface from the at least one radio transceiver.

In embodiments, the central body further includes a power distribution board electrically connected to the flight controller.

In embodiments, the volatile mission memory includes random access memory.

In embodiments, the unmanned aerial vehicle further includes data clearing circuitry operatively connected to the random access memory and configured to clear data in the volatile mission memory upon interruption of electric power to the random access memory for the period of time.

In embodiments, the data clearing circuitry includes at least one capacitor.

In embodiments, the data clearing circuitry includes at least one resistor.

In embodiments, the data clearing circuitry includes at least one capacitor and at least one resistor.

In embodiments, the mission data is stored solely within the volatile mission memory.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. An unmanned aerial vehicle comprising:
   a. a central body comprising:
      i. a flight controller including at least one processor;
      ii. a firmware memory operatively connected to the flight controller and configured to receive and store firmware including processor executable instructions for directing movement of the unmanned aerial vehicle; and
      iii. a circuit board comprising:
         1. A fixed portion comprising:
            a. a flight controller connector operatively connected to the flight controller; and
            b. a signal connection operatively connected to the firmware memory; and
         2. A physically removable portion comprising at least one programming interface connector operatively connected to the signal connection,
            wherein, when the physically removable portion is attached to the fixed portion, the physically removable portion is configured to receive by the at least one programming interface connector the firmware, and provide the firmware to the firmware memory of the flight controller via the signal connection and the flight controller connector of the fixed portion, and
            wherein when the physically removable portion is physically removed from the fixed portion the operative connection between the at least one programming interface connector and the signal connection is eliminated and the at least one programming interface connector does not provide the firmware to the firmware memory, and the physically removable portion is not capable of being physically reattached; and
   b. at least one electric motor operatively connected to the central body and connected to at least one propeller such that the at least one propeller is rotatable by the at least one electric motor,
   wherein the at least one electric motor is controlled by control signals received from the flight controller according to the firmware.

2. The unmanned aerial vehicle of claim 1, wherein the at least one programming interface connector extends out of an exterior of the circuit board.

3. The unmanned aerial vehicle of claim 1, wherein the at least one programming interface connector is the only connector of the unmanned aerial vehicle configured to receive the firmware and to provide the firmware to the firmware memory.

4. The unmanned aerial vehicle of claim 1, wherein the at least one programming interface connector comprises at least one pull-up resistor.

5. The unmanned aerial vehicle of claim 4, wherein the at least one pull-up resistor embodies a match with the flight controller that is a prerequisite to completing a transmit receive circuit allowing the firmware to be received and provided to the firmware memory of the flight controller.

6. The unmanned aerial vehicle of claim 1, wherein the at least one programming interface connector includes a plurality of programming interface connectors.

7. The unmanned aerial vehicle of claim 1, wherein the at least one programming interface connector comprises a plurality of pull-up resistors.

8. The unmanned aerial vehicle of claim 1, wherein the at least one programming interface connector comprises at least one capacitor.

9. The unmanned aerial vehicle of claim 1, wherein removal of the physically removable portion from the fixed portion prevents firmware from being provided to the firmware memory.

10. The unmanned aerial vehicle of claim 1, wherein the central body further comprises a volatile mission memory operatively connected to the flight controller and configured to receive and store mission data including processor executable instructions for providing the control signals to the at least one electric motor based on the firmware to direct movement of the unmanned aerial vehicle according to a mission, and wherein the volatile mission memory is configured to be automatically erased upon interruption of power to the volatile mission memory for a period of time.

11. The unmanned aerial vehicle of claim 10, wherein the volatile mission memory is operatively connected to a removable memory card inserted into a data port of the unmanned aerial vehicle and the mission data is received by the volatile mission memory from the removable memory card.

12. The unmanned aerial vehicle of claim 11, wherein the removable memory card is a removable microSD card.

13. The unmanned aerial vehicle of claim 10, wherein the circuit board further comprises a radio interface operably connected to at least one radio transceiver and the volatile mission memory is operably connected to the radio interface and configured to receive the mission data through the at least one radio transceiver.

14. The unmanned aerial vehicle of claim 10, wherein the volatile mission memory comprises random access memory.

15. The unmanned aerial vehicle of claim 14, further comprising data clearing circuitry operatively connected to the random access memory and configured to clear data in the volatile mission memory upon the interruption of electric power to the random access memory for the period of time.

16. The unmanned aerial vehicle of claim 15, wherein the data clearing circuitry comprises at least one capacitor.

17. The unmanned aerial vehicle of claim 15, wherein the data clearing circuitry comprises at least one resistor.

18. The unmanned aerial vehicle of claim 15, wherein the data clearing circuitry comprises at least one capacitor and at least one resistor.

19. The unmanned aerial vehicle of claim 10, wherein the firmware memory is configured to retain the firmware upon the interruption of power to the firmware memory.

20. The unmanned aerial vehicle of claim 10, wherein the mission data is stored solely within the volatile mission memory.

21. The unmanned aerial vehicle of claim 10, wherein the circuit board further comprises a data port and the volatile mission memory is operably connected to the data port and configured to receive the mission data through the data port.

22. The unmanned aerial vehicle of claim 21, wherein the data port is configured to receive a removable memory card and the volatile mission memory is configured to receive the mission data from the removable memory card.

23. The unmanned aerial vehicle of claim 22, wherein the removable memory card is a removable microSD card.

24. The unmanned aerial vehicle of claim 10, wherein the circuit board further comprises at least one radio interface operably connected to at least one radio transreceiver, wherein the volatile mission memory is operably connected to the at least one radio interface and configured to receive the mission data through the at least one radio interface from the at least one radio transceiver.

25. The unmanned aerial vehicle of claim 1, wherein the fixed portion further comprises a plurality of peripheral connectors operatively connected to at least one peripheral device of the unmanned aerial vehicle.

26. The unmanned aerial vehicle of claim 1, wherein the central body further comprises a power distribution board electrically connected to the flight controller.

27. The unmanned aerial vehicle of claim 1, wherein the firmware memory is encapsulated within an interior portion of the flight controller.

28. The unmanned aerial vehicle of claim 27, wherein at least a portion of the firmware memory is encapsulated by a layer of epoxy covering an otherwise exposed portion of the firmware memory.

29. The unmanned aerial vehicle of claim 1, wherein the firmware memory is a soldered module.

30. The unmanned aerial vehicle of claim 1, wherein the circuit board further comprises an attachment portion connecting the physically removable portion to the fixed portion, and wherein the attachment portion is at least one of: scored, partially scored, weakened, partially weakened, thinned, and partially thinned to allow the physically removable portion to be physically removed from the fixed portion.

31. The unmanned aerial vehicle of claim 1, wherein the signal connection is a trace on the circuit board.

32. The unmanned aerial vehicle of claim 1, wherein the signal connection is a wire embedded within an interior of the circuit board.

33. The unmanned aerial vehicle of claim 1, wherein, when the physically removable portion is attached to the fixed portion, the at least one programming interface connector is configured to receive the firmware from an external memory card.

34. The unmanned aerial vehicle of claim 1, wherein, when the physically removable portion is attached to the fixed portion, the at least one programming interface connector is configured to receive the firmware from an external processor.

35. An unmanned aerial vehicle comprising:
   a. a central body comprising:
      i. a flight controller including at least one processor;
      ii. a firmware memory operatively connected to the flight controller and configured to receive and store firmware including processor executable instructions for directing movement of the unmanned aerial vehicle; and
      iii. a volatile mission memory, physically separate from the firmware memory, operatively connected to the flight controller and configured to receive and store mission data including processor executable instructions for providing control signals based on the firmware to direct movement of the unmanned aerial vehicle according to a mission, wherein the volatile mission memory is configured to be automatically erased upon interruption of power to the volatile mission memory for a period of time; and
   b. at least one electric motor operatively connected to the central body and connected to at least one propeller such that the at least one propeller is rotatable by the at least one electric motor,
   wherein the at least one electric motor is controlled by the control signals provided by the flight controller according to the firmware,
   wherein the mission data is stored solely within the volatile mission memory.

36. The unmanned aerial vehicle of claim 35, wherein the central body further comprises a data port and the volatile mission memory is operably connected to the data port and configured to receive the mission data through the data port.

37. The unmanned aerial vehicle of claim 36, wherein the data port is configured to receive a removable memory card and the volatile mission memory is configured to receive the mission data from the removable memory card.

38. The unmanned aerial vehicle of claim 37, wherein the removable memory card is a removable microSD card.

39. The unmanned aerial vehicle of claim 38, wherein the central body further comprises at least one radio interface operably connected to at least one radio transreceiver, wherein the volatile mission memory is operably connected to the at least one radio interface and configured to receive the mission data through the at least one radio interface from the at least one radio transceiver.

40. The unmanned aerial vehicle of claim 35, wherein the central body further comprises a power distribution board electrically connected to the flight controller.

41. The unmanned aerial vehicle of claim 35, wherein the volatile mission memory comprises random access memory.

42. The unmanned aerial vehicle of claim 41, further comprising data clearing circuitry operatively connected to the random access memory and configured to clear data in the volatile mission memory upon interruption of electric power to the random access memory for the period of time.

43. The unmanned aerial vehicle of claim 42, wherein the data clearing circuitry comprises at least one capacitor.

44. The unmanned aerial vehicle of claim 42, wherein the data clearing circuitry comprises at least one resistor.

45. The unmanned aerial vehicle of claim 42, wherein the data clearing circuitry comprises at least one capacitor and at least one resistor.

* * * * *